(12) United States Patent
Fang et al.

(10) Patent No.: US 11,070,867 B2
(45) Date of Patent: Jul. 20, 2021

(54) METHOD, DEVICE, AND COMPUTING APPARATUS FOR ACQUIRING BROADCASTING CONTENT

(71) Applicant: Alibaba Group Holding Limited, Grand Cayman (KY)

(72) Inventors: Keming Fang, Guangzhou (CN); Pan Xu, Guangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 15/846,816

(22) Filed: Dec. 19, 2017

(65) Prior Publication Data

US 2018/0184155 A1 Jun. 28, 2018

(30) Foreign Application Priority Data

Dec. 22, 2016 (CN) .......................... 201611199443.3

(51) Int. Cl.
*H04N 7/173* (2011.01)
*H04N 21/433* (2011.01)
(Continued)

(52) U.S. Cl.
CPC ... *H04N 21/4334* (2013.01); *H04N 21/44008* (2013.01); *H04N 21/4782* (2013.01); *H04N 21/6125* (2013.01)

(58) Field of Classification Search
CPC ............. H04N 21/6125; H04N 21/431; H04N 21/4312; H04N 21/4147; H04N 21/4622; H04N 21/4782; H04N 21/42219; H04N 21/47202; H04N 21/47205; H04N 21/47217; H04N 21/6175; H04N 21/8173; H04N 21/8586; H04N 21/8166; H04N 21/2368; H04N 21/4334; H04N 21/44008; H04N 21/4331; H04N 21/44; H04N 21/47214
See application file for complete search history.

(56) References Cited

U.S. PATENT DOCUMENTS 7,263,711 B1     8/2007  Estipona
9,386,352 B1 *   7/2016  Shoykhet ......... H04N 21/23439
(Continued)

FOREIGN PATENT DOCUMENTS

CN     102074257 A     5/2011
CN     103428582 A     12/2013
(Continued)

OTHER PUBLICATIONS

Office Action for Chinese Application No. 201611199443.3 dated Nov. 21, 2019, 14 pages.
(Continued)

*Primary Examiner* — Annan Q Shang
(74) *Attorney, Agent, or Firm* — Alston & Bird LLP

(57) ABSTRACT

A method, device, and computing apparatus for acquiring broadcasting content are provided. The method includes: in a recognition step, recognizing a type of multimedia player in a target webpage and an output mode for broadcasting multimedia resource; and in a broadcasting-content acquiring step, based on the type and the output mode, acquiring broadcasting content of a multimedia resource played by the multimedia player.

20 Claims, 4 Drawing Sheets

(51) Int. Cl.
*H04N 21/61* (2011.01)
*H04N 21/4782* (2011.01)
*H04N 21/44* (2011.01)

(56) References Cited

U.S. PATENT DOCUMENTS

| | | | |
|---|---|---|---|
| 2001/0016829 A1* | 8/2001 | Toshikage | H04N 1/00209 705/51 |
| 2007/0183741 A1* | 8/2007 | Lerman | G06F 17/30017 386/249 |
| 2007/0204320 A1* | 8/2007 | Wu | H04N 5/4401 725/135 |
| 2008/0126294 A1 | 5/2008 | Ray et al. | |
| 2008/0155631 A1* | 6/2008 | Liwerant | H04M 7/0039 725/114 |
| 2009/0083670 A1* | 3/2009 | Roos | G06F 15/16 715/850 |
| 2011/0002399 A1* | 1/2011 | Raveendran | H04N 19/172 375/240.28 |
| 2011/0202424 A1* | 8/2011 | Chun | G06F 3/0481 705/26.8 |
| 2011/0202967 A1* | 8/2011 | Hecht | H04N 21/854 725/114 |
| 2011/0219386 A1* | 9/2011 | Hwang | H04N 21/4722 719/328 |
| 2012/0128241 A1* | 5/2012 | Jung | H04N 21/84 382/165 |
| 2012/0210336 A1* | 8/2012 | Greenblatt | G06F 13/102 719/321 |
| 2012/0210356 A1* | 8/2012 | Kiok | H04N 21/254 725/39 |
| 2013/0097309 A1* | 4/2013 | Ma | H04L 29/08099 709/224 |
| 2013/0308919 A1* | 11/2013 | Shaw | H04N 21/6473 386/239 |
| 2014/0115649 A1* | 4/2014 | Kim | H04N 21/234 725/116 |
| 2014/0173680 A1* | 6/2014 | Gilbert | H04N 21/44004 725/134 |
| 2015/0100996 A1* | 4/2015 | Freeman | H04N 21/4622 725/110 |
| 2015/0215661 A1* | 7/2015 | Wang | H04H 20/38 725/109 |
| 2015/0281288 A1* | 10/2015 | Levinson | H04L 47/125 709/219 |
| 2016/0165309 A1* | 6/2016 | Van Brandenburg | H04N 21/4728 725/116 |
| 2016/0295287 A1* | 10/2016 | Jiang | H04N 21/44008 |
| 2016/0344833 A1* | 11/2016 | Hakansson | H04N 21/4621 |
| 2017/0278219 A1* | 9/2017 | Yuan | H04N 21/44218 |
| 2018/0035074 A1* | 2/2018 | Barnes, Jr. | H04N 21/8106 |
| 2018/0098083 A1* | 4/2018 | Mcallister | H04N 19/156 |

FOREIGN PATENT DOCUMENTS

CN 104079981 A 10/2014
CN 105959821 A 9/2016

OTHER PUBLICATIONS

Search Report for Chinese Application No. 201611199443.3 dated Nov. 12, 2019, 2 pages.
Office Action for India Application No. 201714045255 dated Sep. 28, 2020.

* cited by examiner

METHOD, DEVICE, AND COMPUTING APPARATUS FOR ACQUIRING BROADCASTING CONTENT

CROSS-REFERENCES TO RELATED APPLICATIONS

This application claims priority of Chinese Patent Application No. 201611199443.3, filed on Dec. 22, 2016, the entire contents of which are hereby incorporated by reference.

FIELD OF THE DISCLOSURE

The present disclosure relates to the field of internet technology and, more particularly, relates to a method, a device, and a computing apparatus for acquiring broadcasting content.

BACKGROUND

As the technology develops, watching videos by visiting the internet has become an integral part of people's lives. Currently, for most video websites, the Flash plugin or the HTML5 player are used to play the videos. For purposes of sharing or collecting, the users may expect to save or record the videos while watching online. However, so far there are no effective solutions to acquire the video content broadcasted on the webpage to realize the storing or recording of the video content broadcasted on the webpage.

BRIEF SUMMARY OF THE DISCLOSURE

One aspect of the present disclosure provides a method for acquiring broadcasting content performed by computer programs stored in a memory and executable by a processor. The method comprises: recognizing, by the processor, a type of a multimedia player on a target webpage and an output mode for broadcasting multimedia resource; and based on the type and the output mode, acquiring, by the processor, broadcasting content of the multimedia resource played by the multimedia player.

Another aspect of the present disclosure provides a device for acquiring broadcasting content. The device comprises a memory and a processor. The memory is configured to store computer programs for implementing a method for acquiring broadcasting content. The processor is coupled to the memory and, when executing the computer programs, is configured for: recognizing a type of a multimedia player on a target webpage and an output mode for broadcasting multimedia resource; and based on the type and the output mode, acquiring broadcasting content of the multimedia resource played by the multimedia player.

Another aspect of the present disclosure provides a computing apparatus. The computing apparatus comprises a display device, a memory, and a processor. The display device is configured to display information. The memory is configured to store information. The processor is connected to the display device and the memory, and is configured to: recognize a type of a multimedia player on a target webpage and an output mode for broadcasting a multimedia resource; based on the recognized type and the output mode, acquire broadcasting content of the multimedia resource played by the multimedia player; and store the acquired broadcasting content in a multimedia storage region of the memory in a preset format.

Other aspects of the present disclosure can be understood by those skilled in the art in light of the description, the claims, and the drawings of the present disclosure.

BRIEF DESCRIPTION OF THE DRAWINGS

Exemplary embodiments of the present disclosure are described in more details with reference to the accompanying drawings. The foregoing, and other objectives, features and advantages of the present disclosure will become more apparent. Further, in exemplary embodiments of the present disclosure, like reference numerals often represent like components.

DETAILED DESCRIPTION

Figure 1:
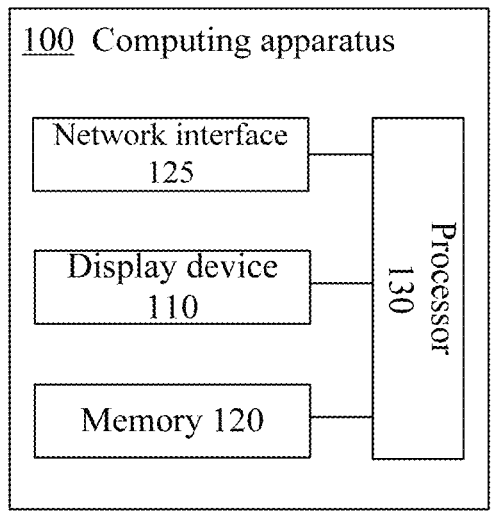
FIG. 1 illustrates a schematic block diagram of a structure of an exemplary computing apparatus according to one embodiment of the present disclosure.

Various embodiments of the present disclosure will be described in more details hereinafter with reference to the accompanying drawings. Though the accompanying drawings illustrate various embodiments of the present disclosure, it should be understood that, the present disclosure may be embodied in various forms and shall not be limited by implementations described herein. On the contrary, such embodiments are provided to enable the present disclosure to be clearer and more complete, and the scope of the present disclosure may be fully delivered to those skilled in the art.

To acquire the multimedia content broadcasted on the webpage when the user browses the webpage to realize the recording of the multimedia content, the present disclosure provides an effective technical solution for content acquiring. By analyzing the broadcasting mechanisms of the multimedia resource on the webpage, such as the type of the multimedia player and the output mode for broadcasting the multimedia resource, the content-acquiring solution of the present disclosure applies processing approaches corresponding to the broadcasting mechanisms to acquire the broadcasted multimedia content.

Method, device, and computing apparatus are provided hereinafter to acquire broadcasting content, thereby effectively acquiring multi-media content broadcasted on the webpage.

According to one aspect of the present disclosure, a method for acquiring broadcasting content is provided, including: a recognition step for recognizing a type of a multimedia player on a target webpage and an output mode for broadcasting multimedia resource; and a broadcasting-content acquiring step for acquiring broadcasting content of the multimedia resource played by the multimedia player.

As such, by analyzing the broadcasting mechanism (the type of the multimedia player, and the output mode when the multimedia resource is played, etc.) of the multimedia resource on the webpage, the present disclosure may utilize a corresponding approach to acquire the multimedia content that is broadcasted.

In one embodiment of the present disclosure, the method may further include a storing step for storing the acquired broadcasting content in a multimedia storage region in a preset format.

In one embodiment of the present disclosure, the multimedia resource may include video resource, and the broadcasting-content acquiring step may include: acquiring a whole or a part of video frames of the video resource broadcasted by the multimedia player one by one or at a frame decreasing rate.

For the video resource, usually, a small portion may vary between a certain number of consecutive image frames. Thus, only the small portion of the consecutive image frames where variation occurs may need to be acquired. Further, for certain video sources with a high frame rate, the frame rate may be reduced under the situation where watching is not affected. As such, the processing amount of the broadcasting-content acquiring step and the processing amount of the subsequent storing step may be reduced.

In one embodiment of the present disclosure, the storing step may include: converting the acquired video frames into the preset format and filling the acquired video frames into designated regions of a canvas buffering region based on location information.

In one embodiment of the present disclosure, the multimedia resource may include audio resource, and the broadcasting-content acquiring step may include: directly acquiring the audio content that is outputted to an audio card for broadcasting.

In one embodiment of the present disclosure, the recognition step recognizes the type of the multimedia player to be a webpage element, such as the HTML5 player. Further, based on the output mode recognized by the recognition step, the broadcasting content may be acquired based on one of the followings: in the broadcasting-content acquiring step, based on the recognized software-decoding output mode, directly acquiring the broadcasting content decoded by the software; or in the broadcasting-content acquiring step, based on the recognized hardware-decoding output mode, directly acquiring the broadcasting content that hasn't been decoded by the hardware followed by software self-decoding, or acquiring the broadcasting content decoded by the hardware by reading data of the hardware.

In one embodiment of the present disclosure, in the recognition step, the type of the multimedia player is recognized to be a webpage plugin, such as the Flash player. Thus, in the broadcasting-content acquiring step, the broadcasting content is acquired by intercepting an output interface.

In one embodiment of the present disclosure, based on the output mode recognized in the recognition step, the following approaches may be applied to acquire the broadcasting content by intercepting the output interface: in the broadcasting-content acquiring step, based on the recognized 2D software-decoding output mode, directly intercepting the output interface to acquire the broadcasting content; in the broadcasting-content acquiring step, based on the recognized 3D software-decoding output mode, intercepting the output content of a plurality of output interfaces and acquires the broadcasting content based on correlation between the plurality of output contents; in the broadcasting-content acquiring step, based on the recognized hardware-decoding output mode, calling an output interface to read the data of the hardware to acquire the broadcasting content.

In one embodiment of the present disclosure, in the broadcasting-content acquiring step, when the target webpage is a non-current webpage, the multimedia player is timedly triggered to keep that the multimedia player broadcasting the multimedia content.

Accordingly, when the target webpage is minimized, the multimedia player may be timedly triggered to enable the multimedia player to continue broadcasting the multimedia content while being minimized on the target webpage.

In one embodiment of the present disclosure, in the broadcasting-content acquiring step, a clipping region is created for the multimedia player to keep the multimedia player broadcasting the multimedia content when the target webpage is the current webpage but a whole or a part of content of the multimedia player is located within the non-display region.

Accordingly, when the multimedia player is entirely or partially blocked on the target webpage, the clipping region may be created for the multimedia player, thereby allowing the continued broadcasting of the multimedia content when the multimedia player is entirely or partially blocked.

According to another aspect of the present disclosure, a device for acquiring broadcasting content is provided, including: a recognition unit, configured for recognizing a type of a multimedia player on a target webpage and an output mode for broadcasting multimedia resource; and a broadcasting-content acquiring unit for acquiring broadcasting content of the multimedia resource played by the multimedia player based on the type and output mode recognized by the recognition unit.

In one embodiment of the present disclosure, the device further includes a storing unit configured for storing the acquired broadcasting content in a multimedia storage region in a preset format.

In one embodiment of the present disclosure, the multimedia resource may include video resource, and the broadcasting-content acquiring step may include: acquiring a whole or a part of video frames of the video resource broadcasted by the multimedia player one by one or at a frame decreasing rate.

In one embodiment of the present disclosure, the type of the multimedia player recognized by the recognition unit is a webpage element, such as the HTML5 player. Further, based on the output mode recognized by the recognition unit, one of the following operations is performed by the broadcasting-content acquiring unit: based on the recognized software-decoding output mode, directly acquiring the broadcasting content decoded by the software; or based on the recognized hardware-decoding output mode, directly acquiring the broadcasting content that hasn't been decoded by the hardware followed by software, or acquiring the broadcasting content decoded by the hardware by reading data of the hardware.

In one embodiment of the present disclosure, the type of the multimedia player recognized by the recognition unit is a webpage plugin, such as the Flash player. Thus, the broadcasting-content acquiring unit acquires the broadcasting content by intercepting an output interface.

In one embodiment of the present disclosure, based on the output mode recognized by the recognition unit, one of the following operations is performed by the broadcasting-content acquiring unit: based on the recognized 2D software-decoding output mode, directly intercepting the output interface to acquire the broadcasting content; based on the recognized 3D software-decoding output mode, intercepting the output content of a plurality of output interfaces and acquiring the broadcasting content based on correlation between a plurality of output contents; based on the recognized hardware-decoding output mode, calling an output interface to read the data of the hardware to acquire the broadcasting content.

In one embodiment of the present disclosure, the broadcasting-content acquiring unit further includes a timed triggering module, configured for timely triggering the multimedia player to keep that the multimedia player broadcasting the multimedia content when the target webpage is a non-current webpage.

In one embodiment of the present disclosure, the broadcasting-content acquiring unit further includes a clipping region creation module, configured to create a clipping region for the multimedia player to keep that the multimedia player broadcasting the multimedia content when the target webpage is the current webpage but the whole or a part of content of the multimedia player is located within the non-display region.

According to another embodiment of the present disclosure, a computing apparatus is provided, including: a display device for displaying information; a memory for storing information; and a processor connected to the display device and the memory. The processor is configured to recognize a type of a multimedia player on a target webpage and an output mode for broadcasting multimedia resource; based on the recognized type and output mode, acquire broadcasting content of the multimedia resource played by the multimedia player; and store the acquired broadcasting content in a multimedia storage region in a preset format.

As such, the disclosed method, device, and computing apparatus for acquiring broadcasting content may apply corresponding processing approaches to acquire the broadcasted multimedia content by analyzing the broadcasting mechanism of the multimedia resource on the webpage, such as the type of the multimedia player and the output mode when the multimedia resource is broadcasted. Accordingly, the saving or recording of the multimedia content watched by the users online may be realized Embodiments of the present disclosure will be described in more details hereinafter with reference to FIG. 1 to FIG. 3. FIG. 1 illustrates a structural block diagram of an exemplary computing apparatus 100 according to one embodiment of the present disclosure. Components of the computing apparatus 100 may include, but be not limited to, a display device 110, a memory 120, a network interface 125, and a processor 130. The processor 130 may be connected to the network interface 125, the display device 110, and the memory 120, respectively. In one embodiment of the present disclosure, the aforementioned and other components not illustrated in FIG. 1 of the computing apparatus 100 may be connected to each other, for example, via a bus. It should be understood that, the structural block diagram of the computing apparatus illustrated in FIG. 1 are for illustrative purposes, and shall not be construed as limiting of the scope of the present disclosure. Those skilled in the relevant art may add or replace other components based on need.

The computing apparatus 100 may be any type of static or mobile computing apparatus, including portable computer or mobile computing apparatus (e.g., tablet, personal digital assistant, laptop computer, notebook computer, netbook, etc.), portable phone (e.g., smart phone), wearable computing apparatus (e.g., smart watch, smart glass, etc.) or other types of mobile apparatuses, or desktop computer or static computing unit of the PC. The computing apparatus 100 may also be a mobile or static server.

The network interface 125 may enable the computing apparatus 100 to communicate with the server via one or more networks. Examples of such networks include local area network (LAN), wide area network (WAN), personal area network (PAN), or a combination of communication networks such as internet. The network interface may include one or more network interfaces (e.g., network interface card, NIC) in any type including wireless or wired, such as the IEEE802.11 wireless local area network (WLAN), worldwide interoperability for microwave access (Wi-MAX) interface, Ethernet interface, universal serial bus (USB) interface, cellular network interface, blue-tooth interface, and near field communication (NFC) interface, etc.

The data used by the computing apparatus 100 to interact with the server (not shown) through the network interface 125 may be stored in the memory 120. The memory 120 may include one or more storage devices in any type that store content in a file format or other formats, including magnetic hard drive, solid-state hard drive, semiconductor memory device, flash drive, or any other computer readable and writable storage medium that is able to store program instructions or digital information. It should be noted that, a part of the interaction information between the computing apparatus 100 and the server may be persistently stored in a designated storage region of the memory 120, and other interaction information may be temporarily stored in the memory of the computing apparatus 100.

The display device 110 may display the video images obtained by interaction of the computing apparatus with the server through the network interface, and the display device 110 may include various types of imaging devices, such as a cathode-ray tube (CRT), liquid crystal display (LCD), light-emitting diode (LED) (including the organic light-emitting diode, OLED), the projection system, and a combination with other supporting electronic devices (e.g., digital-to-analog converter (DAC), analog-to-digital converter (ADC), signal processor, etc.)

Specifically, the computing apparatus 100 may acquire webpage content through the network interface 125, and the acquired webpage content may be displayed by the display device 110. When the browsed target webpage includes multimedia resource, the display device 110 may display the multimedia content broadcasted by the multimedia player on the target webpage. The processor 130 may recognize a type of a multimedia player and an output mode for broadcasting multimedia resource on the target webpage, and based on the recognized type and output mode, acquire broadcasting content of the multimedia resource played by the multimedia player. Further, the processor 130 may further store the acquired broadcasting content in a multimedia storage region of the memory 120 in a preset format.

Figure 2:
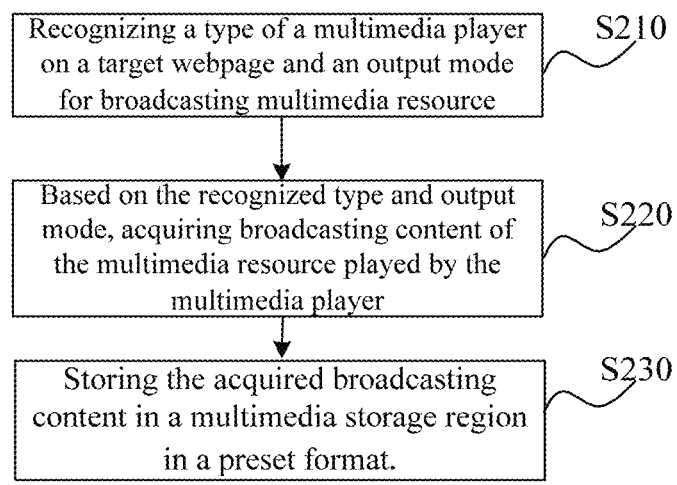
FIG. 2 illustrates a schematic flow chart of an exemplary method for acquiring broadcasting content according to one embodiment of the present disclosure.

The operations executable by the processor 130 may refer to FIG. 2, where FIG. 2 is a flow chart showing a broadcasting-content acquiring method 200 according to one embodiment of the present disclosure.

As shown in FIG. 2, the disclosed broadcasting-content acquiring method 200 may mainly include a recognition step (Step S210) and a broadcasting-content acquiring step (Step S220).

At Step S210, a type of a multimedia player on a target webpage and an output mode for broadcasting multimedia resource are recognized.

At Step S220, based on the recognized type and output mode, broadcasting content of the multimedia resource played by the multimedia player is acquired.

Two types of multimedia broadcasting mechanism are most currently used by video websites in China: one is to play the multimedia resource through a webpage plugin, such as the Flash plugin, and the other is to play the multimedia resource through a webpage element, such as the HTML5 player.

The webpage plugin is a plugin imbedded in a browser or other applications capable of visiting webpages for providing a multimedia playing function, which is closed with respect to the browser or other applications. The webpage element realizes the multimedia playing function through the webpage codes, and the data during the process of using the webpage element to play the multimedia resource is visible with respect to the browser or other applications. Because the broadcasting mechanisms of the webpage plugin and the webpage element are different, when the multimedia player is respectively the webpage plugin and the webpage element, different processing approaches may be adopted to acquire the broadcasting content of the multimedia resource to be played.

Feasible implementations of the broadcasting-content acquiring step are illustrated hereinafter when the multimedia player is the webpage plugin and the webpage element, respectively. It should be understood that, for other types of multimedia players, the multimedia content may be acquired by applying corresponding processing approaches based on the broadcasting mechanism.

1. The Multimedia Player being a Webpage Plugin

Given the Flash plugin as an example, when the type of the multimedia player is detected to be the Flash plugin, the broadcasting content may be acquired from an output interface.

More specifically, when the multimedia player is the Flash plugin, the output mode for broadcasting multimedia resource may be a 2D software-decoding output mode, a 3D software-decoding output mode, and a hardware-decoding output mode.

The 2D software-decoding output mode outputs the data in the RGBA format, and such data may be copied directly. That is, when the output mode is recognized to be the 2D software-decoding output mode, the broadcasting content may be acquired directly from the output interface.

Because the Flash plugin outputs data in different formats based on the properties supported by different display cards, other than outputting the data in the RGBA format, the 3D software-decoding output mode may directly output the data in the YUV format for certain display cards that have a relatively poor compatibility. Accordingly, when the output mode for broadcasting the multimedia resource is recognized to be the 3D software-decoding output mode, the output content may be acquired from a plurality of 3D output interfaces, and the broadcasting content may be acquired based on correlation between a plurality of output contents. For example, mapping may be established when a certain output is started and a certain output comes to an end to obtain the correlation between a plurality of outputs, and the content to be eventually broadcasted may be acquired by properly organizing the contents of the aforementioned plurality of outputs.

The hardware-decoding output mode mainly relies on the graphics processing unit (GPU) for decoding, and the decoded data may be uploaded directly to the display card. During the entire decoding process, the Flash plugin cannot acquire the decoded data. Accordingly, when the output mode for broadcasting the multimedia resource is recognized to be the hardware-decoding output mode, the interface may be called to read the data of the hardware to acquire the broadcasting content. For example, the glReadPixels interface may be called to read the data from the display card. Often, such operation consumes a relatively lot of time, and additional threads may be applied for processing. Because the glReadPixels interface is called to read data directly from the display card, other than the video data itself, the data that is read may further include data such as bullet screen and advertising patch inserted in the video data, etc. The user may select corresponding options in the original video to select whether the data such as the bullet screen needs to be included.

2. The Multimedia Player being the Page Element

Given the HTML5 player as an example, when the type of the multimedia player is recognized to be the HTML5 player, based on the output mode recognized by the recognition step (Step S210), the broadcasting-content acquiring step (Step S220) may adopt the corresponding acquisition approach to acquire the broadcasting content.

During the process that the HTML5 player broadcasts the multimedia resource, the multimedia data and the decoded data are visible to the browser. Thus, the present disclosure provides relatively simple approach for acquiring the broadcasting content with respect to the situation where the multimedia player is the Flash plugin.

Specifically, for the HTML5 player, the output modes may be divided into a software-decoding output mode and a hardware-decoding output mode.

When the output mode is the software-decoding output mode, the broadcasting content decoded by the software may be acquired directly.

The hardware-decoding output mode mainly uses the GPU for decoding, and the decoded data may be updated to the display card directly. Thus, when the output mode is the hardware-decoding output mode, the broadcasting content haven't been decoded by the hardware may be acquired directly for self-decoding by the software. Or, the broadcasting content decoded by the hardware may be acquired by reading the data of the hardware display card.

As such, given the webpage plugin being the Flash plugin and the webpage element being the HTML5 player as examples, the specific implementations of the broadcasting-content acquiring step are illustrated in details. It should be understood that, the webpage plugin and the webpage element may be players other than the aforementioned Flash and HTML5, such as newly-developed multimedia player within the webpage as the technology advances. Such multimedia players may also acquire the broadcasting content of the multimedia resource based on the specific broadcasting mechanism through use of corresponding processing approaches.

The multimedia resource primarily includes the video resource and the audio resource. For the video resource, the aforementioned approaches are often applied. For the audio resource, because the audio content is often outputted to an audio card, the audio content outputted to the video card for broadcasting may be acquired directly.

As shown in FIG. 2, the disclosed broadcasting-content acquiring method 200 may include a storing step S230. At Step S230, the acquired broadcasting content may be stored in a multimedia storage region in a preset format.

For the video resource in the multimedia resource, entire or partial video frames of the video resource played by the video multimedia player may be acquired one by one, or the entire or partial video frames of the vide resource played by the multimedia player may be acquired at a gradually-frame decreasing rate. This is because for the video resource, usually, a small portion may vary between a certain number of consecutive image frames. Thus, only the small portion of the consecutive image frames where variation occurs may need to be acquired. Further, for certain video sources with a high frame rate, the frame rate may be reduced under the condition where watching is not affected. When the entire or partial video frames of the video resources are acquired at a gradually-frame decreasing rate, video frames showing no variation or relatively small variation may be discarded in some cases. Further, when the (entire or partial) video frames are acquired, the initial coordinates and specific width and length of the video frames may be designated for facilitating further storage based on the location of the video frames.

The multimedia storage region may be a canvas buffering region for storing a series of video frames, and the canvas buffering region may be prepared in advance. The canvas dimension of the canvas buffering region may be configured based on the dimension of the acquired video frames, and may be specifically the same as the dimension of video frames of the acquired broadcasting content. For example, the dimension of the canvas of the canvas buffering region may be set to be the initial dimension of the video frames when the broadcasting content is started to be acquired.

As an optional embodiment of the present disclosure, the acquired video frames may be converted into a preset format and be filled in a designated region of the canvas buffering region based on the location information. For example, the acquired video frames may be converted to the data in the RGBA format, and may be filled in the corresponding location of the canvas buffering region based on the location information of the video frames. After the filling of the video frames is completed, the RGBA data in the memory may be converted to its own format based on its service, for example, the RGBA data may be saved as a bitmap (BMP) file, or encoded into the H264 format, etc.

As illustrated in the aforementioned descriptions, for the video resource, usually, only a very small portion varies between several consecutive frames of images, and what is acquired may be a portion of complete frames. Thus, when the acquired video frames are to be filled in the canvas buffering region, the approach of stitching may be applied for filling. For example, after a video frame is filled in the canvas buffering region, for a portion of a video frame that follows the filled video frame, the portion may be filled in the corresponding local region of the canvas buffering region based on the location information thereof while the other regions may use the image filled last time. Thus, the working amount of filling may be reduced, and the efficiency may be improved. In specific implementation, for the acquired video frames, the initial locations and specific widths and lengths to be depicted may be designated. Thus, during re-depiction, only the regions corresponding to the designated location information need to be depicted.

As another optional embodiment of the present disclosure, when the target webpage is a non-current webpage (e.g., the target webpage is minimized or the target webpage is not the current display window) or the target webpage is the current webpage but the entire or partial multimedia player on the target webpage falls within a non-display region (e.g., a part of or the entire multimedia player on the target webpage is blocked), the user cannot see the images of the video. Under such situation, the multimedia player may terminate the output of the image data to avoid unnecessary performance loss. To acquire the broadcasting content under such scenarios, certain measures need to be applied to enable the multimedia player to continue broadcasting the multimedia content.

Given the multimedia player being the Flash plugin as an example, when the target webpage is the non-current-display webpage, the Flash plugin may be triggered at designated moment(s) to enable the Flash plugin to continue broadcasting the multimedia content. When the target webpage is in the current webpage and all or a part of the content of the multimedia player is in the non-display region, a clipping region (or a visual clipping region) may be created for the multimedia player to keep the multimedia player broadcasting the multimedia content.

As such, given the multimedia player being the Flash plugin as an example, when the target webpage is the non-current-display webpage or the target webpage is the current display webpage but all or a part of the multimedia player on the target webpage is in the non-display region, exemplary illustration of the approaches applied to maintain the broadcasting of the multimedia content played by the multimedia player are provided. It should be understood that, the present disclosure may use various other solutions to implement the continuous broadcasting of the Flash plugin under the aforementioned situation, and for situations where the multimedia player is the HTML5 player or other types of players, the aforementioned or other solutions may also be applied to maintain the broadcasting of the multimedia content.

As such, the multimedia content acquiring method of the present disclosure is illustrated in detail with reference to FIG. 2. The disclosed multimedia content acquiring method may be applied to applications that are able to visit webpages, such as browser, and other applications that have the webpage-visiting function like APP of Wechat and Toutiao, etc. For example, when the user uses the browser to open the video resource on the webpage, the disclosed multimedia content acquiring method may be applied to acquire the multimedia content that is broadcasted, thereby realizing the recording of the broadcasted multimedia content. Specific applications of the present disclosure will be illustrated using the Flash plugin as an example.

Figure 3:
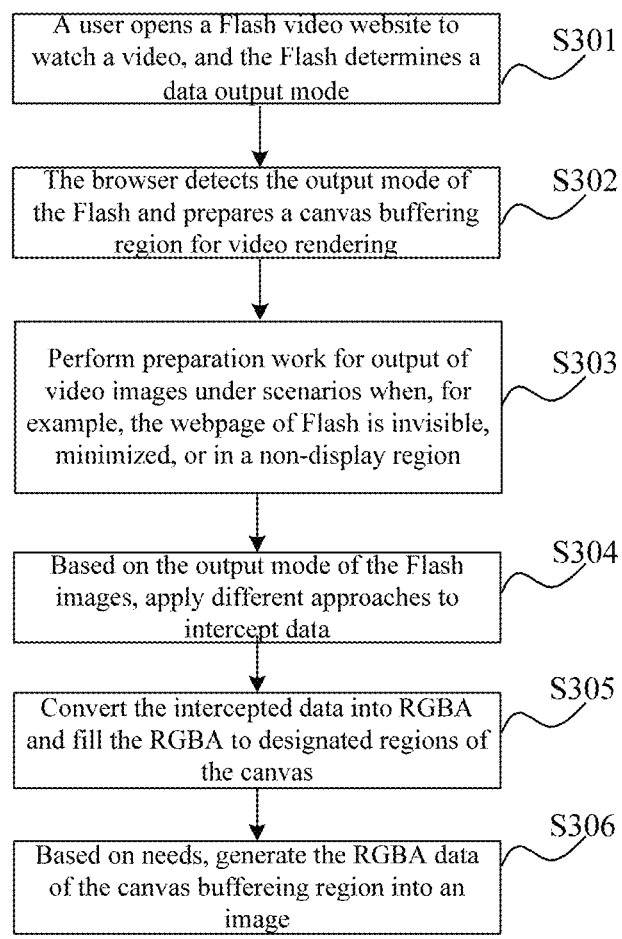
FIG. 3 illustrates a schematic flow chart for recording a video watched online based on a browser.

FIG. 3 illustrates an exemplary flow chart of applying the present disclosure to a browser for recording a video watched online. Referring to FIG. 3, at Step S301, a user opens a Flash video website (most current video websites in China are about Flash videos) to watch a video. The Flash requests the currently supported properties from the browser, and determines whether the mode of 2D output, 3D output or the hardware decoding is adopted based on the internally implemented logics. At Step S302, the browser detects the output mode of the Flash image data, and prepares the corresponding canvas buffering region based on the initial dimension of the Flash, where the displaying format of the canvas buffering region in the memory is the RGBA format.

At Step S303, for the browser and the Flash to avoid unnecessary losses of the performance, when the browser is minimized or the Flash page is in a non-display tab or the rolling bar is dragged to roll the Flash plugin to a non-display region, the user cannot see the Flash image, and the Flash may terminate the output of the image data to avoid unnecessary performance loss. Under such scenarios, if images need to be intercepted, the images need to be cracked one by one to enable the Flash to output the image data. When the browser is minimized or the Flash webpage is in the non-display Tab, the browser terminates the callback with respect to the programming interface of the Flash, and without receiving the callback, the Flash performs no further output of the images. Directed towards such type of situations, acquisition solutions of the present disclosure may design a timed task to trigger the callback already terminated by the browser, such that the Flash may continue to output the data. When the rolling bar is dragged to roll the Flash plugin to the non-display region, the browser may notify a new clipping region to the Flash, and when the Flash determines that the clipping region is invisible, the data may not be further outputted. Under such situation, a visible clipping region may be forged for Flash, thus allowing the Flash to continue outputting the images.

At Step S304, based on the detected output mode of the Flash image data, different data processing solutions may be adopted.

The processing of the 2D output mode is the simplest, and the output format itself is the RGBA format, which can be copied directly from the memory.

The processing of the 3D output mode is relatively complicated, in which a plurality of output interfaces need to be intercepted, and mapping needs to be established when a certain output is started and a certain output comes to an end. Further, other than the RGBA format, for certain display cards with a relatively poor compatibility, the 3D output mode may directly output the YUV format.

The last type is the hardware-decoding output mode, and this approach can be the hardest to handle. The Flash transmits the video data to the GPU process for decoding, and the decoded video data is transmitted to the display card directly. That is, the plugin process cannot acquire the video data, and under such situation, the glReadPixels interface needs to be called directly to read the display card data directly. Such operation is a little bit time-consuming, and additional thread needs to be opened for processing.

At Step S305, data intercepted using various intercepting approaches needs to be converted uniformly into the RGBA format, and the data is filled in the designated region of the canvas buffering region based on given location information. To maximize the performance, the images outputted by the Flash each time are not entire images, and a certain region of images may be acquired. Thus, directional copying and filling are needed herein.

At Step S306, a full set of video images are filled, and based on service demands, the RGBA data in the memory needs to be converted to its own format, for example, the RGBA data is saved as a BMP file or encoded into a H264 format, etc.

Figure 4:
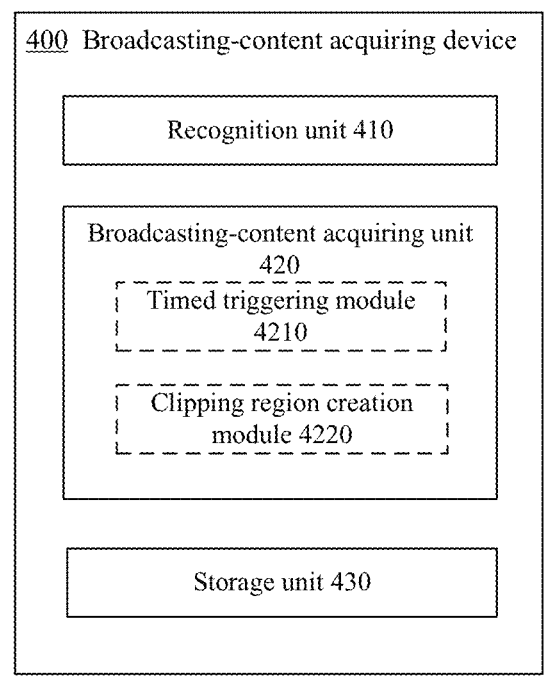
FIG. 4 illustrates a schematic flow chart of a structure of an exemplary device for acquiring broadcasting content according to one embodiment of the present disclosure.

FIG. 4 illustrates a functional block diagram of an exemplary broadcasting-content acquiring device 400 according to an embodiment of the present disclosure. Functional modules of the broadcasting-content acquiring device 400 may be implemented by hardware, software, or a combination of hardware and software according to the principles of the present disclosure. For example, the functional modules may be implemented by the processor 130 of the computing apparatus 100 in FIG. 1. Those skilled in the art shall understand that, functional modules described in FIG. 4 may be combined or divided into sub-modules, thereby implementing the principles of the present disclosure. Thus, descriptions of this paper may support any possible combination or division or further definition of functional modules described in the present disclosure.

Referring to FIG. 4, the broadcasting-content acquiring device 400 may include a recognition unit 410 and a broadcasting-content acquiring unit 420.

The recognition unit 410 is configured to recognize the type of the multimedia player on the target webpage and the output mode for broadcasting the multimedia resource.

The broadcasting-content acquiring unit 420 may acquire the broadcasting content of the multimedia resources played by the multimedia player based on the type and the output mode recognized by the recognition unit.

Based on the broadcasting type of the multimedia player and the output mode for broadcasting the multimedia resources recognized by the recognition unit 410, different modes may be applied to acquire the broadcasting content of the multimedia resource played by the multimedia player. When the multimedia player is the webpage plugin and the webpage element, respectively, the operations executable by the broadcasting-content acquiring unit 420 are illustrated hereinafter in details. It should be understood that, for the multimedia player applying other broadcasting mechanisms, the broadcasting-content acquiring unit 420 may use processing approaches corresponding to the broadcasting mechanism to acquire the multimedia content.

1. The Multimedia Player being the Webpage Plugin

Given the Flash plugin as an example, when the recognition unit 410 recognizes that the type of the multimedia player is the Flash plugin, the broadcasting-content acquiring unit 420 may acquire the broadcasting content by intercepting the output interface.

Specifically, when the recognized output mode is the 2D software-decoding output mode, the broadcasting-content acquiring unit 420 may directly intercept the output interface to acquire the broadcasting content.

When the recognized output mode is the 3D software-decoding output mode, the broadcasting-content acquiring unit 420 may intercept the output contents of a plurality of output interfaces and acquire the broadcasting content based on the correlation between the output contents.

When the recognized output mode is the hardware-decoding output mode, the broadcasting-content acquiring unit 420 may call the interface to read the data of the hardware to acquire the broadcasting content.

2. The Multimedia Player being the Webpage Element

Given the HTML5 player as an example, when the recognition unit 410 recognizes that the type of the multimedia player is the HTML5 player, based on the output mode recognized by the recognition unit 410, the broadcasting-content acquiring unit 420 may perform corresponding operations.

Specifically, when the recognized output mode is the software-decoding output mode, the broadcasting-content acquiring unit 420 may directly acquire the broadcasting content decoded by the software. When the recognized output mode is the hardware-decoding output mode, the broadcasting-content acquiring unit 420 may directly acquire the broadcasting content that hasn't been decoded by the hardware followed by software self-decoding, or the broadcasting content decoded by the hardware may be acquired by reading the data of the hardware.

As such, using the webpage plugin being the Flash plugin and the webpage element being the HTML5 player as examples, the specific processes for the broadcasting-content acquiring unit 420 to acquire the broadcasting content of the multimedia resource are illustrated in detail. It should be understood that, when the webpage plugin is other plugins or the webpage element is other players, the broadcasting-content acquiring unit 420 may acquire the broadcasting content of the multimedia resource by using the corresponding processing approaches based on specific broadcasting mechanism. The multimedia resource mainly includes the video resource and the audio resource. For the video resource, the aforementioned approaches may be applied, and for the audio resource, because the audio content is directly outputted to the sound card, the audio content outputted to the sound card for broadcasting may be acquired directly.

As shown in FIG. 4, the broadcasting-content acquiring device 400 may optionally include a storage unit 430. The storage unit 430 may be configured to store the broadcasting content acquired by the broadcasting-content acquiring unit in the multimedia storage region in the preset format.

When the multimedia resource includes the video resource, the broadcasting-content acquiring unit 420 may acquire the entire or partial video frames of the video resource played by the video multimedia player one by one, or acquire the entire or partial video frames of the vide resources played by the multimedia player at a frame decreasing rate. This is because, for the video resource, the variation between consecutive frames of images is often a very small portion. Thus, only the small portion showing the variation occurred in the consecutive video frames may need to be acquired. Thus, for certain video resource with a high frame rate, the broadcasting-content acquiring unit 420 may be acquire the video resource with a reduced frame rate under the condition where watching is not affected. When the entire or partial video frames of the video resources are acquired at a reduced frame rate, video frames showing no variation or relatively small variation may be discarded. Further, when the (entire or partial) video frames are acquired, the initial coordinates and specific width and length of the video frames may be designated for facilitating the subsequent storage.

The multimedia storage region may be a canvas buffering region for storing a series of video frames, and the canvas buffering region may be prepared in advance. The canvas dimension of the canvas buffering region may be configured based on the dimension of the acquired video frames, and may be specifically the same as the dimension of video frames of the acquired broadcasting content. For example, the canvas dimension of the canvas buffering region may be set to be the initial dimension of the video frames when the broadcasting content is started to be acquired.

As an optional embodiment of the present disclosure, the storage unit 430 may convert the acquired video frames into the preset format and fill the video frames in the designated region of the canvas buffering region based on the location information. For example, the acquired vide frames may be converted to data having the RGBA format and may be filled in the corresponding location of the canvas buffering region based on the location information of the video frames. After the filling of the video frames is completed, the RGBA data in the memory may be converted to its own format based on the service demand, for example, the RGBA data may be saved as a BMP file, or encoded into the H264 format, etc.

As illustrated in the aforementioned descriptions, for the video resource, usually, the variation between consecutive frames of images is often a very small portion, and what is acquired may be a portion of the complete frames. Thus, when the storage unit 430 fills the acquired video frames in the canvas buffering region, the approach of stitching may be applied for filling. For example, after a video frame is filled in the canvas buffering region, for a portion of a video frame that follows the filled video frame, the portion may be filled in the corresponding local region of the canvas buffering region based on the location information thereof, and the other regions may use the image filled last time. Thus, the working amount of the filling may be reduced, and the efficiency may be improved. In specific implementation, for the acquired video frames, the initial locations and specific widths and lengths that need to be depicted may be designated. Thus, during re-depiction, only the regions corresponding to the designated location information need to be depicted.

As shown in FIG. 4, the broadcasting-content acquiring unit 420 may include a timed triggering module 4210 and a clipping region creation module 4220. The broadcasting-content acquiring unit 420 may be configured to trigger the multimedia player at designated time to enable the multimedia player to continue broadcasting the multimedia content when the target webpage is the non-current webpage. When the target webpage is in the current webpage and all or a part of the content of the multimedia player is on the non-display region, the clipping region creation module 4220 may create a clipping region for the multimedia player to enable the multimedia player to keep broadcasting the multimedia content.

The foregoing illustrates a method, a device, and a computing apparatus for acquiring broadcasting content in details with reference to the accompanying drawings. One specific implementation of the present disclosure is illustrated in details hereinafter with reference to one specific application example.

Application Examples

Figure 5:
FIG. 5 illustrates a schematic view of effects of a specific implementation of the present disclosure.

The disclosed broadcasting-content acquiring method may be applied to the browser or other applications that have the webpage-visiting function, such as Wechat and Toutiao, etc. FIG. 5 illustrates a diagram showing effects of applying the present disclosure to a browser application. As shown in FIG. 5, after the browser application adds the broadcasting-content acquiring function of the present disclosure, when the user uses the browser to log in a video website to watch the videos online, the recording function (e.g., clicking on a recording button of the operation panel) of the browser may be used to store the videos played online. The left portion of the image in FIG. 5 is the video watched online using the browser, and the right portion of the image in FIG. 5 is the effect diagram showing the logo or sign of the browser (upper right corner) and the intercepted video data being outputted to a window using the present disclosure. As such, the video content broadcasted online may be acquired based on the present disclosure, and the saving or recording of the video content broadcasted online may be realized.

As such, directed towards different webpage broadcasting mechanisms, the disclosed broadcasting-content acquiring methods may use different approaches to acquire the broadcasting content. For example, directed towards the 2D output mode, the 3D output mode, and the hardware output decoding approach for the Flash plugin, and the software-decoding output mode and the hardware-decoding output mode for the HTML5 player, different data processing approaches may be executed to acquire the broadcasting content. Further, to ensure that the broadcasting content is acquired continuously, directed towards the interaction features between the Flash plugin and the browser, a well-defined system may be established to acquire data from the Flash plugin, for example, a timed task callback interface may be established and a clipping region may be forged, etc. Further, when the data is intercepted, the entire or part of the video frames may be acquired at a frame decreasing rate. When the video frames are depicted to the canvas buffering region, the approach of stitching and depicting may be applied to reduce the CPU consumption to the lowest. Accordingly, the broadcasting-content acquiring method of the present disclosure may be utilized to realize the functions such as online video recording and image capturing and storing, etc.

Further, the method according to the present disclosure may be implemented as a computer program, and the computer program may include computer program codes and instructions of the aforementioned steps defined in the aforementioned method of the present disclosure. Or, the method according to the present disclosure may be implemented as a computer program product, and the computer program product may include a computer-readable medium. The computer readable medium stores the computer programs for executing the aforementioned functions defined in the aforementioned method of the present disclosure. Those skilled in the relevant art may further understand that various exemplary logic blocks, modules, circuits, and algorithm steps may be implemented into electronic hardware, computer software or a combination thereof with reference to the disclosure herein.

For example, various embodiments may provide a non-transitory computer-readable storage medium containing computer-executable program instructions (or computer programs) for, when executed by a processor, performing the disclosed method for acquiring broadcasting content.

The flow charts and the block diagrams of the accompanying drawings illustrate system architecture, function, and operation possibly implemented by systems and methods according to various embodiments of the present disclosure. With this regard, each block in the flow chart or block diagram may represent a part of a module, program section or code, and the part of the module, program section or code may include one or more executable instructions for implementing the defined logic functions. It should be noted that, in certain implementations used as alternatives, the functions denoted in the block diagram may happen in orders different from that labeled in the accompanying drawings. For example, two consecutive block diagrams may be executed basically in parallel, or executed in reversed order, depending on involved functions. It should be further noted that, each block in the block diagram or flow chart, or combinations of blocks in the block diagram and/or flow chart, may be implemented using the hardware-based system executing defined functions or operations, or may be implemented through combinations of specific hardware and computer instructions.

Foregoing illustrates various embodiments of the present disclosure. The aforementioned illustrations are for illustrative purposes, are not exhaustive, and shall not be limited to the embodiments disclosed herein. Without departing from the scope and spirit of various embodiments, various modifications and alterations are obvious to those ordinarily skilled in the relevant art. The technical terms selected by this paper are intended to illustrate the principles, actual applications or improvements on the technologies in the market of each embodiment, or enable other ordinarily skilled in the relevant art to understand each embodiment disclosed herein.

What is claimed is:

1. A method for acquiring and storing broadcasting multimedia content performed by computer programs stored in a memory and executable by a processor, the method comprising:
   while broadcasting multimedia content is being broadcasted on a webpage, analyzing, by the processor, a broadcasting mechanism of a multimedia resource corresponding to the broadcasting multimedia content, wherein analyzing the broadcasting mechanism of the multimedia resource includes:
      recognizing, by the processor, a type of a multimedia player on the webpage and an output mode for broadcasting the multimedia resource;
   acquiring, by the processor, based at least in part on the recognized multimedia player type and the recognized output mode, the broadcasting multimedia content at a gradually decreasing frame rate;
   storing, by the processor, during the broadcasting of the broadcasting multimedia content on the webpage, the acquired broadcasting multimedia content in the memory; and
   when acquiring the broadcasting multimedia content and when the webpage is a non-current webpage, timely triggering, by the processor, the multimedia player to keep broadcasting the multimedia content.

2. The method according to claim 1, wherein:
the acquired broadcasting multimedia content is stored in a multimedia storage region in a preset format.

3. The method according to claim 2, wherein:
the multimedia resource includes a video resource; and
acquiring, by the processor, the broadcasting multimedia content includes:
   acquiring, by the processor, a whole or a part of video frames of the video resource played by the multimedia player one by one.

4. The method according to claim 3, wherein:
the multimedia storage region is a canvas buffering region configured to store a series of video frames, and
a canvas dimension of the canvas buffering region is substantially same as an initial dimension of the video frames when the broadcasting multimedia content is started being acquired.

5. The method according to claim 4, wherein storing, by the memory, the acquired broadcasting multimedia content includes:
   converting, by the processor, each of the acquired video frames into the preset format, and
   filling, by the processor, each of the acquired video frames to a corresponding region of the canvas buffering region based on location information, wherein after an acquired video frame is filled to the corresponding region of the canvas buffering region, a portion of another acquired video frame following the acquired video frame is filled in a corresponding region of the canvas buffering region based on corresponding location information while remaining regions of the canvas buffering region are filled with the acquired video frame based on corresponding location information.

6. The method according to claim 1, wherein:
the multimedia resource includes an audio resource, and
acquiring, by the processor, the broadcasting multimedia content includes:
   acquiring, by the processor, audio content outputted to a sound card for playing.

7. The method according to claim 1, wherein:
the type of the multimedia player is recognized to be a webpage element, and
based on the recognized output mode, the broadcasting multimedia content is acquired based on one of following:
   based on a recognized software-decoding output mode, directly acquiring the broadcasting multimedia content decoded by software; and
   based on a recognized hardware-decoding output mode, directly acquiring the broadcasting multimedia content that hasn't been decoded by the hardware followed by software self-decoding, or acquiring the broadcasting multimedia content decoded by hardware by reading data of the hardware.

8. The method according to claim 1, wherein:
the type of the multimedia player is recognized to be a webpage plugin, and
the broadcasting multimedia content is acquired by intercepting an output interface.

9. The method according to claim 8, wherein:
based on the recognized output mode, following approaches are applied to acquire the broadcasting multimedia content by intercepting the output interface:
based on a recognized 2D software-decoding output mode, directly intercepting an output interface to acquire the broadcasting multimedia content;
based on a recognized 3D software-decoding output mode, intercepting output contents of a plurality of output interfaces and acquiring the broadcasting multimedia content based on correlation between the plurality of output contents; and
based on a recognized hardware-decoding output mode, calling an output interface to read data of the hardware to acquire the broadcasting multimedia content.

10. The method according to claim 1, wherein:
when acquiring the broadcasting multimedia content and when the webpage is a current webpage and a whole or a part of content of the multimedia player is on a non-display region, a clipping region is created for the multimedia player to keep the multimedia player broadcasting the multimedia content.

11. A device for acquiring and storing broadcasting multimedia content, comprising:
a memory, for storing computer programs for a method for acquiring broadcasting multimedia content;
a processor, coupled to the memory and, when executing the computer programs, configured for:
while broadcasting multimedia content is being broadcasted on a webpage, analyzing, by the processor, a broadcasting mechanism of a multimedia resource corresponding to the broadcasting multimedia content, wherein analyzing the broadcasting mechanism of the broadcasting multimedia content comprises recognizing, by the processor, a type of a multimedia player on the webpage and an output mode for broadcasting the multimedia resource;
acquiring, by the processor and based at least in part on the recognized multimedia player type and the recognized output mode, the broadcasting multimedia content at a gradually decreasing frame rate;
storing, by the processor, during the broadcasting of the multimedia content on the webpage, the acquired broadcasting multimedia content in the memory; and
when acquiring the broadcasting multimedia content and when the webpage is a non-current webpage, timely triggering, by the processor, the multimedia player to keep broadcasting the multimedia content.

12. The device according to claim 11, wherein:
the acquired broadcasting multimedia content is stored in a multimedia storage region in a preset format.

13. The device according to claim 12, wherein: the multimedia resource includes a video resource, and acquiring the broadcasting multimedia content includes:
acquiring a whole or a part of video frames of the video resource played by the multimedia player one by one.

14. The device according to claim 11, wherein:
the type of the multimedia player is recognized to be a webpage element, and
based on the recognized output mode, acquiring the broadcasting multimedia content includes one of:
based on a recognized software-decoding output mode, directly acquiring the broadcasting multimedia content decoded by software; or
based on a recognized hardware-decoding output mode, directly acquiring the broadcasting multimedia content that hasn't been decoded by the hardware followed by software self-decoding, or acquiring the broadcasting multimedia content decoded by hardware by reading data of the hardware.

15. The device according to claim 14, wherein based on the recognized output mode, acquiring the broadcasting multimedia content includes one of following operations:
based on a recognized 2D software-decoding output mode, directly intercepting the output interface to acquire the broadcasting multimedia content;
based on the recognized 3D software-decoding output mode, capturing output content of a plurality of output interfaces and acquiring the broadcasting multimedia content based on a mutual relationship between a plurality of output contents; and
based on a recognized hardware-decoding output mode, calling an output interface to read data of the hardware to acquire the broadcasting multimedia content.

16. The device according to claim 11, wherein:
the type of the multimedia player is a webpage plugin, and
the broadcasting multimedia content is acquired by intercepting an output interface.

17. The device according to claim 11, wherein the processor is further configured for:
when the webpage is a current webpage and a whole or a part of content of the multimedia player is on a non-display region, creating a clipping region for the multimedia player to keep the multimedia player broadcasting the multimedia content.

18. A computing apparatus, comprising:
a display device, configured to display information;
a memory, configured to store information; and
a processor, connected to the display device and the memory, the processor being configured to:
while multimedia content is being broadcasted on a webpage, analyze a broadcasting mechanism of a multimedia resource corresponding to the multimedia content, by recognizing a type of a multimedia player on the webpage and an output mode for broadcasting the multimedia resource;
acquire, based at least in part on the recognized multimedia player type and the recognized output mode, the broadcasting multimedia content at a gradually decreasing frame rate;
store the acquired broadcasting multimedia content in the memory; and
when acquiring the broadcasting multimedia content and when the webpage is a non-current webpage, timely trigger the multimedia player to keep the multimedia player broadcasting the multimedia content.

19. The computing apparatus of claim 18, wherein:
the acquired broadcasting multimedia content is stored in a multimedia storage region in a preset format.

20. The computing apparatus of claim 18, wherein:
the multimedia resource includes a video resource; and
acquiring, by the processor, the broadcasting multimedia content includes:
acquiring, by the processor, a whole or a part of video frames of the video resource played by the multimedia player one by one.

* * * * *